United States Patent [19]

Takeda et al.

[11] 4,051,528
[45] Sept. 27, 1977

[54] APPARATUS FOR OPTICALLY RECONSTRUCTING INFORMATION

[75] Inventors: Yasutsugu Takeda, Tokorozawa; Hisashi Nakamura, Tokyo; Yoshito Tsunoda, Mitaka; Toshihisa Tsukada, Tokyo; Toshimitsu Miyauchi, Hachioji, all of Japan

[73] Assignee: Hitachi, Ltd., Japan

[21] Appl. No.: 661,806

[22] Filed: Feb. 26, 1976

[30] Foreign Application Priority Data

Feb. 26, 1975 Japan .................................. 50-22878

[51] Int. Cl.² ............................................ H04N 5/86
[52] U.S. Cl. .................... 358/128; 358/132; 358/213; 358/216
[58] Field of Search ............ 178/7.1, DIG. 27, 6.7 A, 178/6.7 R; 340/173 LT, 173 LM, 173 LS; 357/18, 19; 358/128, 130, 132, 212, 213, 214, 216

[56] References Cited

U.S. PATENT DOCUMENTS

| | | | |
|---|---|---|---|
| 3,795,902 | 3/1974 | Russell | 340/173 LM |
| 3,854,005 | 12/1974 | Castrignano | 358/132 |
| 3,856,987 | 12/1974 | McMann | 358/216 |
| 3,932,862 | 1/1976 | Graven | 357/19 |
| 3,962,688 | 6/1976 | Westerberg | 340/173 LT |
| 3,971,002 | 7/1976 | Bricot | 340/173 LM |

*Primary Examiner*—Howard W. Britton
*Attorney, Agent, or Firm*—Craig & Antonelli

[57] ABSTRACT

Optical information reconstructing apparatus comprising a disc having at least one surface on which groups of dots bearing information are concentrically or spirally arrayed, a mechanism for rotating the disc, a light source for projecting a light beam on the array of groups of dots, and at least one photodetector for detecting diffracted light waves from the groups of dots, characterized in that a semiconductor laser array is used as the light source and that the light emission is switched from one laser source to another in the laser array in tracking the information.

12 Claims, 8 Drawing Figures

FIG. 1A PRIOR ART
FIG. 2A
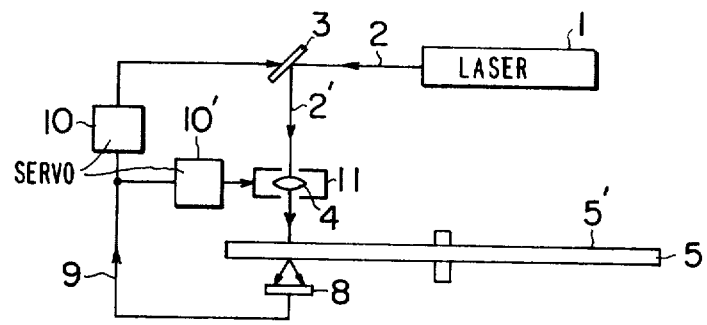
FIG. 1B PRIOR ART
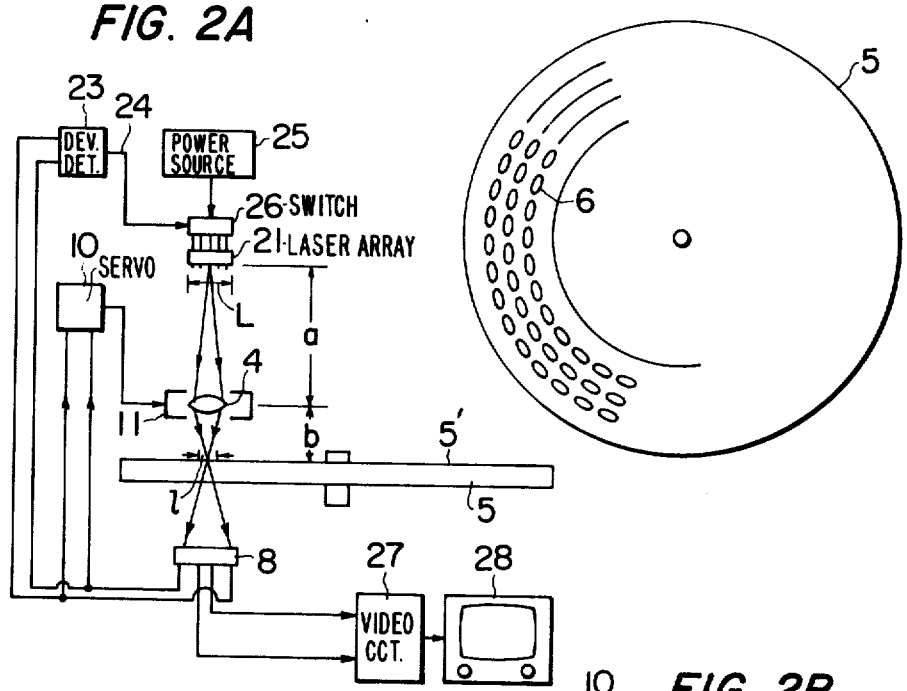
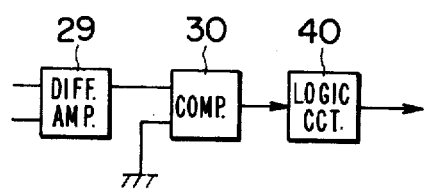
FIG. 2C
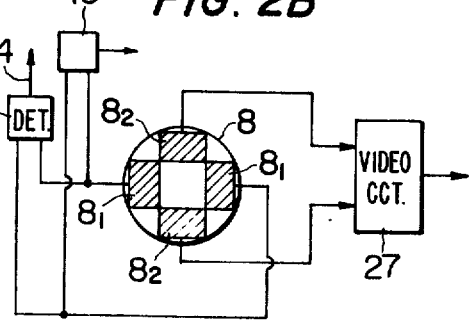
FIG. 2B

APPARATUS FOR OPTICALLY RECONSTRUCTING INFORMATION

BACKGROUND OF THE INVENTION

1. Field of the Invention

This invention relates to apparatus for optically reconstructing information, and more particularly to apparatus for optically reading out information recorded on a disc surface.

2. Description of the Prior Art

Apparatus for optically reconstructing recorded information have heretofore been provided in the form of an optical video disc, an optical information retrieval system, an optical record, etc. For example, in the case of the optical video disc, dot information recorded concentrically or spirally on a disc surface rotates with the rotation of the disc. In order to read out the information, a laser beam produced by a laser source illuminates the rotating disc, and light reflected from the information or transmitted therethrough is received by a photodetector. The information is read in the sequence of the recording. A picture or a sound is reconstructed from the information read out.

However, this type of optical read-out apparatus requires a high precision in tracking the information. Hereunder, the extent of tracking precision which is needed will be explained by taking the optical video disc as an example.

The pitch of the arrayal of the information disposed on the disc is 1.5 - 2.0μm, while the size of each dot of the information is approximately 0.6 - 1.3 μm. According to the manufacturing standards of the video disc, etc., the allowance of the machine precision of a hole at the center of the disc is 100 μm. The disc can therefore have an eccentricity of 100 μm. On the other hand, it is subjected to a high speed rotation of, for example, 1,800 revolutions/min. Under such severe conditions, the required tracking precision must be about 1.5 -2.0μm in the pitch direction, and about 1.0 μm in the direction perpendicular to the pitch direction.

For this reason, the desired tracking precision is usually achieved by utilizing a feedback control system, as will be described below. As seen in FIG. 1A, a laser beam 2 emergent from a laser 1 is directed onto a movable mirror 3, and a reflected light beam 2' from the mirror is guided through a lens 4 onto one surface 5' of a disc 5 so as to illuminate a dot-shaped information 6 (shown in FIG. 1B) recorded on the disc surface 5'. Simultaneously therewith, in order that the reflected light beam 2' may track the information, an output 9 from a detector 8 for reading the information controls the deflection mirror 3 through a servo circuit 10.

In order to form the laser beam 2, 2' into a spot having a size of 1 - 2.0 μm on the disc surface, the focal plane of the lens 4 should exactly coincide with the disc surface 5'. To this end, the lens 4 is supported by a voice coil 11 and is controlled through a servo circuit 10' by the use of the output 9.

As may be understood from this example, very high machine accuracies are required for the prior art system. The maintenance of the required precision and proper adjustment of the equipment is therefore extremely difficult to accomplish under general surrounding conditions, as found in homes, for example. Another disadvantage is the high cost of the system.

SUMMARY OF THE INVENTION

It is an object of this invention to provide an optical information reconstructing apparatus which has a high tracking precision.

Another object of this invention is to provide an optical information reconstructing apparatus which has very few parts requiring mechanical adjustment for proper operation and which is low in cost.

Still another object of this invention is to provide an optical reconstructing apparatus which is highly reliable.

In order to accomplish such objects, this invention adopts an array of semiconductor light emitting elements for the tracking of information and switches the light emissions of the light emitting elements of the array.

Hereunder, this invention will be described in detail with reference to the accompanying drawings.

BRIEF DESCRIPTION OF THE DRAWINGS

FIG. 1A is a schematic diagram showing a prior art optical information reconstructing apparatus;

FIG. 1B is a diagram showing a disc for use in the apparatus shown in FIG. 1A;

FIG. 2A is a schematic diagram showing an embodiment of an optical information reconstructing apparatus according to this invention;

FIGS. 2B and 2C are schematic diagrams showing the detail constructions of the essential portions of the embodiment shown in FIG. 2A;

DESCRIPTION OF THE PREFERRED EMBODIMENTS

Figure 3:
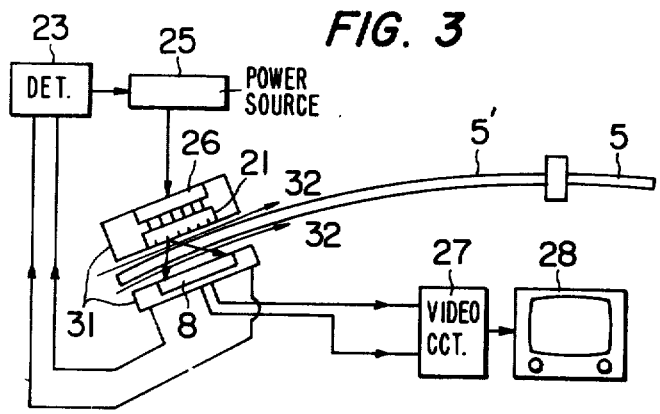
FIG. 3 is a schematic diagram showing another embodiment of an optical information reconstructing apparatus according to this invention.

FIG. 2A is a diagram showing an embodiment of an optical information reconstructing apparatus according to this invention, while FIG. 2B is a diagram for explaining the essential portions of the embodiment. In FIGS. 2A and 2B, the same symbols as in FIG. 1A designate the same or equivalent parts. Numeral 21 indicates a semiconductor laser array composed of a plurality of semiconductor light emitting elements which can be driven independently. The plurality of semiconductor light emitting elements or semiconductor lasers preferably are arrayed in a straight line. The respective semiconductor lasers emit light independently. In general, the pulse response characteristic of the semiconductor lasers is in the order of a nanosecond (ns). The response speed therefore is high enough to read out information, recorded on a disc, under the conditions specified in the foregoing description of the prior art.

Letting the number of the semiconductor lasers be N, the value N changes considerably over a wide range in dependence on the intended use of the apparatus. Where the number is small, it is at least 3, and where it is large, it is at most 500. In the present embodiment, the number N shall be 100 to facilitate explanation of the invention. Each semiconductor laser provides a point light source having a diameter of 1 μm, and such semiconductor lasers are arrayed or spaced at intervals of 10 μm. Accordingly, the full length of the semiconductor laser array 21 is 1 mm. A lens 4 is arranged betwen the semiconductor laser array 21 and one surface 5' of a disc 5 on which information is recorded in the form of an array of dots. Letting $a$ denote the distance between the semiconductor laser array 21 and the lens 4, $b$ the distance between the lens 4 and the surface 5' of the disc 5, and $f$ the focal distance of the lens, the constituents are arranged so as to achieve the relation of Equation (1) for the values $a$, $b$, and $c$ (hereinafter, the relation shall be termed the "conjugate relation"):

$$\frac{1}{a} + \frac{1}{b} = \frac{1}{f} \qquad (1)$$

In the present embodiment, $a = 10\ b$. That is, the constituent members are arranged so that a reduced optical image of the semiconductor laser array may be focused on the disc surface 5'. Thus, the interval of the semiconductor laser sources is reduced to 1 μm, and the whole length to L = 100 μm. Since the size of the point light source itself it close to the optical diffraction limit of the lens 4, the dimensions of the point light source being substantially 1 μm in diameter, they are focused as they are.

Now, the information recorded on the surface 5' of the disc is arrayed spirally in this example. In order to read out the spiral information, therefore, the semiconductor laser array 21 is fed in the radial direction of the disc 5 in coordination with the rotation thereof. That is, the movement of the semiconductor laser array 21 from one track to another track (the tracks being formed by the continuous arrayal of the information) is performed by the hitherto well-known moving means associated with video discs, magnetic discs, etc., in quite the same way. The detailed description of the moving means is therefore omitted from the explanation of this invention.

The method for recording the information on one surface 5' of the disc 5, that is, the coding method, is well known in itself; both digital coding and analog coding are possible. For this reason and since the recording method is not directly pertinent to the optical information reconstructing apparatus according to this invention, further description thereof is also omitted.

Numeral 23 in FIG. 2A indicates detecting means to detect deviation of a light beam. As shown in FIG. 2C, this detecting means may be formed by a differential amplifier 29, a comparator 30 whose one input is connected to an output from the differential amplifier 29 and whose input is grounded, and a logic circuit 40 whose input is connected to an output from the comparator 30. Numeral 25 in FIG. 2A repesents a driving power source for the semiconductor laser array 21. Shown at 26 is a switching circuit which is connected between the driving power source 25 and the semiconductor laser array 21. Numeral 27 designates a video circuit, and 28 a TV monitor.

Where an eccentricity of, for example, the disc 5 arises in the embodiment shown in FIG. 2A, the positions of the respective semiconductor laser sources for the semiconductor laser array 21 must be moved in order that the laser beams emergent from the semiconductor laser array 21 may be prevented from deviating from (i.e., failing to intercept) the spiral tracks. To this end, tracking is performed by sequentially switching the light emissions from one to another of the 100 semiconductor laser sources. Such tracking will be explained with reference to FIG. 2B.

FIG. 2B is a diagram which shows the construction of a photodetector 8 in the embodiment of FIG. 2A in detail. The photodetector 8 is split into one set of light detecting elements $8_1$ and another set of light detecting elements $8_2$. The one set of light detecting elements $8_1$ serve to detect on the basis of a difference in the amounts of received light, whether the position of the laser source in the semiconductor laser array 21 (or the position of the light emitting point of the laser array) deviates outwards relative to the track concerned. The other set of light detecting elements $8_2$ serve to read the information. Signals read by the light detecting elements $8_2$ become input signals of the video circuit 27, in which a video signal is produced. The video signal from the video circuit 27 becomes an input of the TV monitor 28, in which the information is reconstructed.

Outputs of the one set of light detecting elements $8_1$ become inputs of the detecting means 23. Since the detecting means 23 comprises the differential amplifier 29 and the comparator 30, the outputs of the two light detecting elements $8_1$ become the respective inputs of the differential amplifier 29. The differential amplifier 29 amplifies the difference between the outputs of the one set of detector elements $8_1$. More specifically, when the position of the light emitting point of the semiconductor laser array 21 deviates outside of the particular track beyond a certain fixed value, the beam impinges more on the outer one of the one set of detector elements $8_1$, and the amount of light reception of the outer element becomes larger, so that a difference at one polarity arises between the outputs of the two detector elements $8_1$. Likewise, when the position of the light emitting point of the semiconductor laser array 21 deviates inwards relative to the particular track, the inner detector element receives more light, so that a difference of opposite polarity arises between the outputs of the two detecting elements $8_1$. In consequence, the difference of the outputs from the one set of detector elements $8_1$ is amplified by the differential amplifier 29. The output of the differential amplifier 29 becomes a signal in the positive direction when the beam deviates outwardly of the particular track, whereas it becomes a signal in the negative direction when the beam deviates inwardly. Such signal becomes one input of the comparator 30 so that a signal of a high level or "1" is produced from the comparator 30 in case of receipt of a signal in the positive direction and that a signal of a low level on "0" is produced therefrom in case of receipt of a signal in the negative direction. That is, the output of the differential amplifier 29 becomes a signal 24 which is coded by the comparator 30.

The coded signal 24 is delivered to the logic circuit 40, which forms by the use of the signal judgment on which semiconductor light source in the semiconductor laser array 21 the driving power source 25 is to be connected with. The switching circuit 26 is actuated by an output from the logic cicuit 40 in response thereto. When the signal 24 is the result of detection of an outward deviation, the inner semiconductor laser adjacent to the semiconductor laser which is at that time emitting light is caused to emit light, and the light emission (oscillation) of the latter semiconductor laser is stopped. When the signal 24 is the result of detection of an inward deviation, the outer laser source adjacent to the laser source which is at that time emitting light is caused to emit light. That is, where the position of the light emitting point of the semiconductor laser array has deviated onto the outer side of the particular track, the laser source which will illuminate the immediately adjacent inner track is brought into light emission, and conversely, where it has deviated onto the inner side, the laser source which will illuminate the immediately adjacent outer track is brought into light emission.

As understood from such tracking method, in accordance with this invention, the plurality of laser sources in the semiconductor laser array 21 are arranged so as not to be parallel to the tracks.

In the present embodiment, the eccentricity of the disc 5 with respect to the axis of rotation is at most 100 $\mu$m, in the absolute value ($\pm 50$ $\mu$m), and hence it is covered by L = 100 $\mu$m. The arrayal pitch of the images on the disc surfaces 5' by the semiconductor laser sources is substantially equal to the size of each semiconductor laser source itself on the disc surface 5', and hence, it is impossible that any information will be missed during reading in the course the switching selection of the laser sources. This consideration on the arrayal is one of specific measures for effectively achieving the objects of the invention.

In accordance with this invention, it is also effective to employ a semiconductor LED array instead of the semiconductor laser array as the light emitting element array. With regard to the brightness of the point source of light, the semiconductor laser is $10^2$ times as bright as the semiconductor LED. Therefore, in consideration of the photodetector sensitivity for reading the information, the semiconductor laser is preferable. Also, in consideration of the fact that the control of the spot diameter on the disc surfaces is easy, and other advantages, the semiconductor laser array is more favorable.

In accordance with this invention, it is more advantageous to fabricate the semiconductor laser array into a monolithic form. The reasons therefor are that the positional accuracy of the array of the respective laser sources is easily controlled and that the uniformity in the brightness of the respective semiconductor lasers can be ensured.

Desirably, the semiconductor laser sources of the semiconductor laser array are brought into the buried heterostructure, which is well known in itself (T. Tsukada, "GaAs-Ga$_{1-x}$ Al$_x$As buried heterostructure injection lasers," Journal of Applied Physics 45, 4899, Nov. 1974). According to the structure, spot-like light emission is attained more easily than with the conventional double heterostructure. In realizing the apparatus of this invention, the buried heterostructure is especially meritorious with respect to provision of a low loss of the quantity of light.

FIG. 3 shows a second embodiment of this invention. This embodiment has two advantageous features not provided in the first embodiment.

As a first feature, a semiconductor laser array 21 is arranged in proximity to one surface 5' of a disc 5, and a beam of a semiconductor laser directly reads information from the disc surface 5'. In this case, with the rotation of the disc 5, an air current layer 32 is formed between the disc surface 5' and a slider 31 which serves to support the semiconductor laser array 21. The thickness of the air current layer held at a constant value when the rotational frequency of the disc, the configuration of the slider, the thickness of the disc, etc., are determined. The phenomenon itself is already known in aerodynamics. By making the most of the feature, all of the problems concerning the adjustments of the mutual positions between the semiconductor lasers and the disc as well as the other parts of the optical system are solved. As a result, the voice coil 11, lens 4, and the servo circuit 10 shown in FIG. 2A become unnecessary, and the construction is markedly simplified. In FIG. 3 parts bearing the same symbols as in FIG. 2A are the same as or equivalent to those in FIG. 2A.

In case of the present embodiment, however, the pitch of the lasers of the semiconductor laser array 21 cannot be optically reduced unlike the case of the first embodiment. For this reason, a construction is employed which will be explained with reference to FIG. 4 and which brings forth the second feature.

Figure 4:
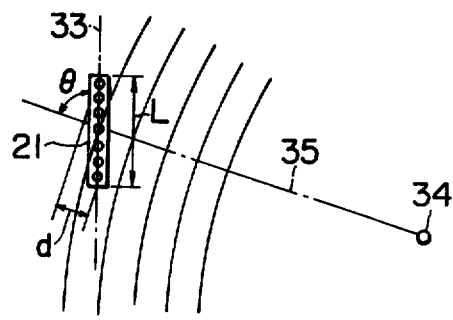
FIG. 4 is a diagram illustrating the operation of the embodiment shown in FIG. 3A.

As illustrated in FIG. 4, according to the embodiment of FIG. 3, the direction of the axis of the array (shown at 33 in FIG. 4) of the semiconductor lasers is inclined by an angle $\theta$ relative to the radial direction (shown at 35 in FIG. 4) of the disc 5 whose center lies on the axis of rotation 34 thereof. The angle $\theta$ so selected as to satisfy the following equation (2):

$$\theta \approx \cos^{-1}\frac{d}{L} \qquad (2)$$

where L denotes the total length of the array of the semiconductor lasers, and $d$ the absolute value of the allowable error of the eccentricity of the disc. The factor $d/L$ has a value of $10^{-1}$ to $10^{-2}$, for example.

Thus, the pitch of the substantial array of the semiconductor lasers in the radial direction as viewed from the axis of rotation 34 (in other words, in the direction in which tracks vibrate) is reduced to $\cos \theta$ times as large as the real pitch and becomes a desired value. In consequence, no information is missed during reading by the switching of the semiconductor laser sources.

The foregoing embodiments have been explained as employing a light emitting element array. Needless to say, however, if an element which has an elongated light emitting portion and in which only parts of the light emitting portion can be caused to emit light by control signals is developed, the same beneficial results will be attained with such element. Although the foregoing embodiments have referred to the transmission type video disc as an example in order to make the explanation brief, this invention can, of course, be applied to a reflection type video disc.

The embodiments of this invention as described above have merits to be summarized hereunder. The superiority of this invention over the reconstructing apparatus of the prior art consists in that the precision mechanical structure, such as the movable mirror, need not be employed for the information tracking group and that the tracking can be fully accomplished by electronic circuits. More specifically, the prior art apparatus involves such disadvantages that the optical system of the movable mirror, etc., is not immune to ambient conditions such as external vibration, temperature change, etc., and that readjustments after the apparatus has gotten out of order are laborious. In contrast, according to this invention, the apparatus is immune to vibrations and temperature changes owing to the electronic tracking. Since the number of elements to be adjusted is small, the reliability is high. The circuitry is simplified. Further, the fabrication of the semiconductor laser array and the switching circuit for the driving power source can be respectively accomplished by mass-producing processes and are therefore more advantageous from the point of view of cost than the fabrication of a movable mirror. For these reasons, the apparatus of this invention is suitable for systems which are frequently used in home and offices.

It is needless to say that this invention is also applicable to an information processing system, such as an optical memory. In such case, the absolute value of the eccentricity of the rotation of the disc is small, and the total numbe of semiconductor laser sources may sometimes be one order smaller, for example in the range of about 5 -10. The array of the dot-like information on the disc is sometimes concentric. It is apparent, however, that such system essentially requires the reading of the information along tracks, and it is considered as an object of practical use of this invention.

Figure 5:
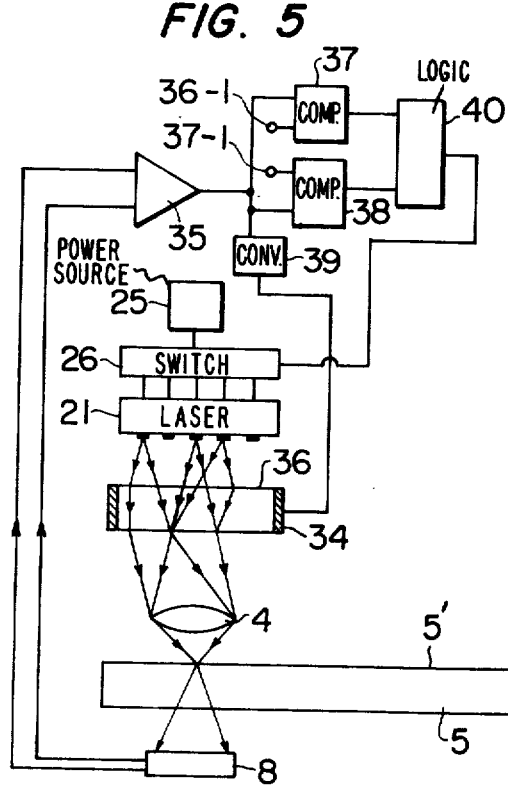
FIG. 5 is a schematic diagram showing still another embodiment of an optical information reconstructing apparatus according to this invention.

It has been explained above that the tracking is performed by the switching of the light emissions of the discrete semiconductor lasers. This invention, however, is not restricted thereto, but may adopt a construction in which a beam deflector of an A–O (accousto-optical) crystal, being well known in itself, is additionally incorporated. FIG. 5 is a diagram showing an embodiment in this case. In the embodiment, an optical path deflector 36 formed of an A–O crystal is interposed between a semiconductor laser array 21 and a lens 4. Here, the number N of semiconductor laser sources in the semiconductor laser array 21 is small, for example, ten.

In FIG. 5, where the A–O crystal 36 is not driven, a part on which no laser spot falls appears on a disc surface 5'. By applying a voltage to the A–O crystal 36, a laser spot can be caused to impinge on the part. The tracking is continued by driving the A–O crystal 36 with a signal of a tracking state as detected by a photodector 8. When the deflecting angle of the A–O crystal 36 is exceeded, the semiconductor laser sources are switched, whereupon the tracking is further continued.

Hereunder, such tracking will be described in detail. As described in FIG. 2B, the photodetector 8 is composed of one set of light detecting elements $8_1$ and another set of light detecting elements $8_2$ as in FIG. 2B. Outputs of the light detecting elements $8_1$ become inputs of differential amplifier 35, as seen in FIG. 5, to produce a signal of positive polarity or negative polarity from the differential amplifier 35 as previously stated. Whether the output signal has a positive or negative polarity is discriminated by a first comparator 37 and a second comparator 38. As another input of the first comparator 37, a voltage of a predetermined threshold value in the positive direction (a voltage corresponding to the limit deflection angle of the A–O deflector 36) is applied from a terminal 37-1; while, as another input of the second comparator 38, a voltage of a predetermined threshold value in the negative direction is applied from a terminal 38-1. Thus, when the output from the differential amplifier 35 does not exceed the predetermined threshold value of the comparators 37 or 38, no ouput is generated from the comparators. At this time, the output of the differential amplifier 35 is applied as an input of a voltage-frequency converter 39 and is converted into a frequency signal. The frequency signal becomes an input of a transducer 34 which drive the A–O crystal 36. The beam from the semiconductor laser array 21 is deflected by the A–O crystal 36, and the tracking proceeds. When the output of the differential amplifier 35 exceeds the threshold value of the comparator 37 or 38, in other words, when the deflection angle of the A–O crystal 36 is exceeded, an output is generated from either of the comparators 37 and 38, for example, from the comparator 37 in case where the output of the differential amplifier 35 is the signal in the positive direction. The output of the comparator 37 is applied as an input of a logic circuit 40. The logic circuit 40 judges which semiconductor laser source in the semiconductor laser array 21 is to be energized through a switch 26 from the power source 25. An output from the logic circuit 40 drives the switch 26.

In the construction of FIG. 5, the optical path deflector may use an E–O (electric-optical) crystal instead of the A–O crystal.

While we have shown and described several embodiments in accordance with the present invention, it is understood that the same is not limited thereto but is susceptible of numerous changes and modifications, as known to a person skilled in the art, and we therefore do not wish to be limited to the details shown and described herein but intend to cover all such changes and modifications as are obvious to one of ordinary skill in the art.

What is claimed is:

1. In an apparatus for optically reconstructing information provided on a disc on which a plurality of information bearing dots are arrayed in at least one track, including means to rotate said disc, a light source capable of projecting a beam onto the plurality of dots, and a photodetector which detects diffracted light waves from the plurality of dots, the improvement beng characterized in that said light source comprises an array formed of a plurality of semiconductor light emitting elements which can be driven independently and said photodetector comprises at least one set of light detecting elements capable of detectng a deviation of said beam from the tracks of dots, and further including driving means responsive to said photodetector for individually driving selected light emitting elements in said array to effect a tracking of said array of dots by said light source.

2. The optical information reconstructing apparatus according to claim 1 wherein said light emitting elements in said array are linearly arranged and disposed at an angle to the track of said plurality of dots.

3. The optical information reconstructing apparatus according to claim 1 wherein said light emitting elements are semiconductor lasers.

4. The optical information reconstructing apparatus according to claim 3 wherein each semiconductor laser is buried heretostructure injection laser.

5. The optical information reconstructing apparatus according to claim 3 wherein said semiconductor lasers are fabricated in a monolithic form.

6. The optical information reconstructing apparatus according to claim 1 wherein said driving means comprises a power supply and switching means for selectively connecting said power supply to selected ones of said light emitting elements.

7. The optical information reconstructing apparatus according to claim 1 wherein said array of semiconductor light emitting elements lies at a close distance from a surface of said disc and this distance is fixed by an air current layer.

8. The optical information reconstructing apparatus according to claim 2 wherein the angle $\theta$ which the arrayal direction of said semiconductor light emitting elements in said array defines to a tangential line of a circular arc in the arrayal direction of said plurality of dots satisfies the following equation:

$$\theta \approx \cos^{-1}\frac{d}{L}$$

where d: absolute of an allowable error of the eccentricity of
  the disc,
  L: arrayal length of said semiconductor light emitting elements.

9. The optical information reconstructing apparatus according to claim 1, further including a beam deflector arranged between said array of semiconductor light emitting elements and said disc, and control means of controlling the deflecting angle of said beam deflector to the outputs from said set of detecting elements.

10. The optical information reconstructing apparatus according to claim 9 wherein said control means comprises a differential amplifier having inputs connected to said set of detecting elements, first and second comparators each having one input connected to the output of said differential amplifier and a second input connected to a respective threshold voltage source, and logic source for controlling said driving means in response to the ouputs of said first and second comparators.

11. The optical imformation reconstructing apparatus according to claim 10 wherein said driving means comprises a power supply and switching means for selectively connecting said power supply to selected ones of said light emitting elements.

12. The optical information reconstructing apparatus according to claim 1 wherein a lens is arranged between said array of semiconductor light emitting elements and one surface of said disc having said dots arrayed thereon, and said array and said surface forms planes conjugate to each other with respect to said lens.

* * * * *